United States Patent
Misaka

(10) Patent No.: US 10,574,856 B2
(45) Date of Patent: Feb. 25, 2020

(54) IMAGE READING APPARATUS WITH REFERENCE SURFACE TO GENERATE REFERENCE DATA FOR SHADING CORRECTION, AND RELATED IMAGE FORMING APPARATUS AND METHOD

(71) Applicants: KABUSHIKI KAISHA TOSHIBA, Tokyo (JP); TOSHIBA TEC KABUSHIKI KAISHA, Tokyo (JP)

(72) Inventor: Naoyuki Misaka, Mishima Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/176,921

(22) Filed: Oct. 31, 2018

(65) Prior Publication Data

US 2019/0068830 A1    Feb. 28, 2019

Related U.S. Application Data

(63) Continuation of application No. 15/404,765, filed on Jan. 12, 2017, now Pat. No. 10,136,027.

(51) Int. Cl.
| | |
|---|---|
| *H04N 1/401* | (2006.01) |
| *H04N 1/04* | (2006.01) |
| *H04N 1/12* | (2006.01) |
| *H04N 1/40* | (2006.01) |
| *H04N 1/00* | (2006.01) |
| *H04N 1/407* | (2006.01) |

(52) U.S. Cl.
CPC ......... *H04N 1/401* (2013.01); *H04N 1/00018* (2013.01); *H04N 1/00029* (2013.01); *H04N 1/00082* (2013.01); *H04N 1/00814* (2013.01); *H04N 1/04* (2013.01); *H04N 1/0464* (2013.01); *H04N 1/125* (2013.01); *H04N 1/40006* (2013.01); *H04N 1/4076* (2013.01); *H04N 2201/0081* (2013.01); *H04N 2201/0094* (2013.01)

(58) Field of Classification Search
CPC ..... H04N 1/125; H04N 1/4076; H04N 1/4078
See application file for complete search history.

(56) References Cited

U.S. PATENT DOCUMENTS

| | | | | |
|---|---|---|---|---|
| 5,798,847 | A | * | 8/1998 | Aerts ..................... H04N 1/401 358/464 |
| 5,982,948 | A | * | 11/1999 | Shimada .............. H04N 1/1013 358/461 |

(Continued)

*Primary Examiner* — Scott A Rogers
(74) *Attorney, Agent, or Firm* — Kim & Stewart LLP

(57) ABSTRACT

An image reading apparatus according to an embodiment includes an image reading unit configured to generate reference data by reading a reference surface and to generate image data by reading a sheet. A reference unit has a reference surface. A shading correction unit determines whether a portion of the reference surface includes a contaminant based on image data generated by the image reading unit reading the portion of the reference unit. When the portion of the reference surface is determined to not include a contaminant, the shading correction unit generates reference data based on the image data generated by the image reading unit reading the portion of the reference surface determined to not include a contaminant.

20 Claims, 7 Drawing Sheets

(56) References Cited

U.S. PATENT DOCUMENTS

| | | | |
|---|---|---|---|
| 6,292,269 B1 * | 9/2001 | Kawai | H04N 1/4076 358/1.9 |
| 6,989,915 B2 * | 1/2006 | Honjo | H04N 1/00909 358/461 |
| 7,411,704 B2 | 8/2008 | Wang | |
| 7,518,760 B2 * | 4/2009 | Matsuda | H04N 1/125 358/474 |
| 7,558,437 B2 * | 7/2009 | Misaka | H04N 1/401 358/461 |
| 7,692,818 B2 | 4/2010 | Futami | |
| 7,777,918 B2 | 8/2010 | Sekizawa et al. | |
| 7,808,680 B2 | 10/2010 | Lee | |
| 7,830,563 B2 | 11/2010 | Aoki | |
| 8,004,726 B2 * | 8/2011 | Misaka | H04N 1/4076 358/420 |
| 8,054,511 B2 | 11/2011 | Aoki et al. | |
| 8,174,732 B2 * | 5/2012 | Oteki | H04N 1/00002 358/3.26 |
| 8,320,029 B2 | 11/2012 | Kamei | |
| 8,467,108 B2 * | 6/2013 | Shimatani | H04N 1/125 358/461 |
| 8,514,452 B2 * | 8/2013 | Tsukahara | H04N 1/407 358/2.1 |
| 8,553,295 B2 | 10/2013 | Nishida et al. | |
| 8,570,611 B2 | 10/2013 | Tanaka et al. | |
| 8,614,839 B2 | 12/2013 | Sano et al. | |
| 8,767,268 B2 * | 7/2014 | Tsukahara | H04N 1/00013 358/461 |
| 8,995,028 B2 | 3/2015 | Kato et al. | |
| 9,578,204 B2 | 2/2017 | Kii et al. | |
| 9,860,394 B2 | 1/2018 | Kanaya | |
| 2003/0090742 A1 | 5/2003 | Fukuda et al. | |
| 2006/0061830 A1 * | 3/2006 | Sakakibara | H04N 1/4097 358/448 |
| 2009/0059319 A1 | 3/2009 | Aoki et al. | |
| 2009/0180157 A1 | 7/2009 | Shimatani | |
| 2011/0164290 A1 * | 7/2011 | Nishikawa | H04N 1/00909 358/461 |
| 2011/0181919 A1 | 7/2011 | Okutsu | |
| 2011/0181922 A1 * | 7/2011 | Tanimoto | H04N 1/00543 358/474 |
| 2011/0199653 A1 * | 8/2011 | Nishikawa | H04N 1/00909 358/483 |
| 2012/0112401 A1 | 5/2012 | Tokutsu et al. | |
| 2017/0180603 A1 | 6/2017 | Hatayama et al. | |
| 2017/0353613 A1 | 12/2017 | Morikawa | |
| 2017/0366693 A1 | 12/2017 | Fujise | |

* cited by examiner

IMAGE READING APPARATUS WITH REFERENCE SURFACE TO GENERATE REFERENCE DATA FOR SHADING CORRECTION, AND RELATED IMAGE FORMING APPARATUS AND METHOD

CROSS-REFERENCE TO RELATED APPLICATION

This application is a continuation of U.S. patent application Ser. No. 15/404,765, filed Jan. 12, 2017, the entire contents of which are incorporated herein by reference.

FIELD

Embodiments described herein relate generally to an image reading apparatus, an image forming apparatus, and a method for generating image data.

BACKGROUND

An image reading apparatus reads an image on a sheet by using an image sensor such as a reduction optical system (a charge coupled device (CCD)) or a unit-magnification optical system (a contact image sensor (CIS)). The image reading apparatus may have individual variations in illumination from a light source for illuminating a reading surface of a sheet or vignetting from a lens of the image sensor. The differences occur during manufacture and also occur due to aging degradation of the apparatus. The individual variations are a factor for generating irregularities in image data by reading. Therefore, a shading correction for correcting the irregularities in the image is performed.

The shading correction requires white reference data indicating a reference value of brightness corresponding to white. The white reference data is generated by reading a white reference surface which is provided on the image reading apparatus. Therefore, if a contaminant is on the reference plate surface, suitable white reference data is not acquired and there is a possibility that accuracy in the shading correction is lowered.

DETAILED DESCRIPTION

An image reading apparatus according to an embodiment includes an image reading unit configured to generate reference data by reading a reference surface and to generate image data by reading a sheet. A reference unit has a reference surface. A shading correction unit determines whether a portion of the reference surface includes a contaminant based on image data generated by the image reading unit reading the portion of the reference unit. When the portion of the reference surface is determined to not include a contaminant, the shading correction unit generates reference data based on the image data generated by the image reading unit reading the portion of the reference surface determined to not include a contaminant.

Hereinafter, an image reading apparatus, an image reading method, and an image forming apparatus, of the embodiment will be described with reference to drawings.

Figure 1:
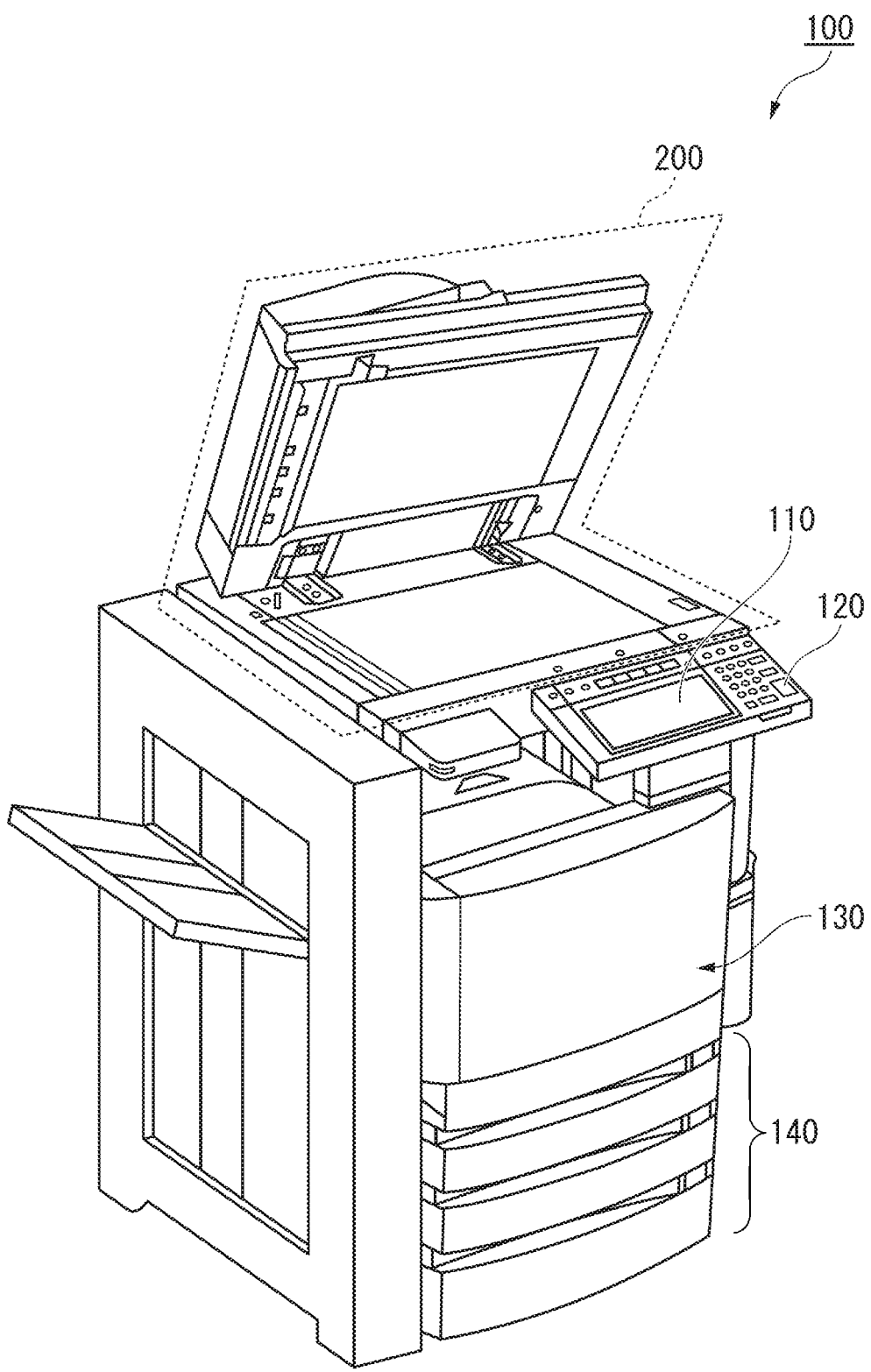
FIG. 1 is a perspective diagram illustrating an example configuration of an image forming apparatus according to an embodiment.

FIG. 1 is a perspective diagram illustrating an example configuration of an image forming apparatus 100 according to an embodiment. The image forming apparatus 100 is, for example, a multifunction peripheral. The image forming apparatus 100 includes a display 110, a control panel 120, a printer unit 130, a sheet housing unit 140, and an image reading unit 200. The printer unit 130 of the image forming apparatus 100 may be a device which forms a toner image, or may be an ink jet type device.

The image forming apparatus 100 forms an image on a sheet using a developer such as toner. The sheet is, for example, a paper, or a label sheet. The sheet may be any sheet as long as an image can be formed on the front surface of the sheet by the image forming apparatus 100.

The display 110 is an image display device such as a liquid crystal display (LCD), or an organic electro luminescence (EL) display. The display 110 displays various types of information items relating to the image forming apparatus 100.

The control panel 120 includes a plurality of buttons. The control panel 120 receives input of an operation from a user. The control panel 120 outputs a signal in accordance with the operation input by the user to a control unit of the image forming apparatus 100. The display 110 and the control panel 120 may be configured as an integrated touch panel.

The printer unit 130 forms an image on the sheet based on image information generated by the image reading unit 200 or image information s received through a communication interface. The printer unit 130 forms an image by the following process, for example. An image forming unit of the printer unit 130 forms an electrostatic latent image on a photoreceptor drum based on the image information. The image forming unit of the printer unit 130 forms a visible image by applying a developer to the electrostatic latent image. As an example of the developer, toner may be used. A transfer unit of the printer unit 130 transfers the visible image to a sheet (different from a target sheet that was read). The fixing unit of the printer unit 130 fixes the visible image on the sheet by performing heating and pressing the sheet. The sheet on which the image is formed may be a sheet which is stored in the sheet housing unit 140. Alternatively, the sheet may be manually fed.

The sheet housing unit 140 stores the sheet to be used for forming an image in the printer unit 130.

The image reading unit 200 reads image information of a read target as brightness and darkness of light. The image reading unit 200 records the read image information. The recorded image information may be transmitted to the other information processing device through a network. The recorded image information may be formed on the sheet by the printer unit 130.

Figure 2:
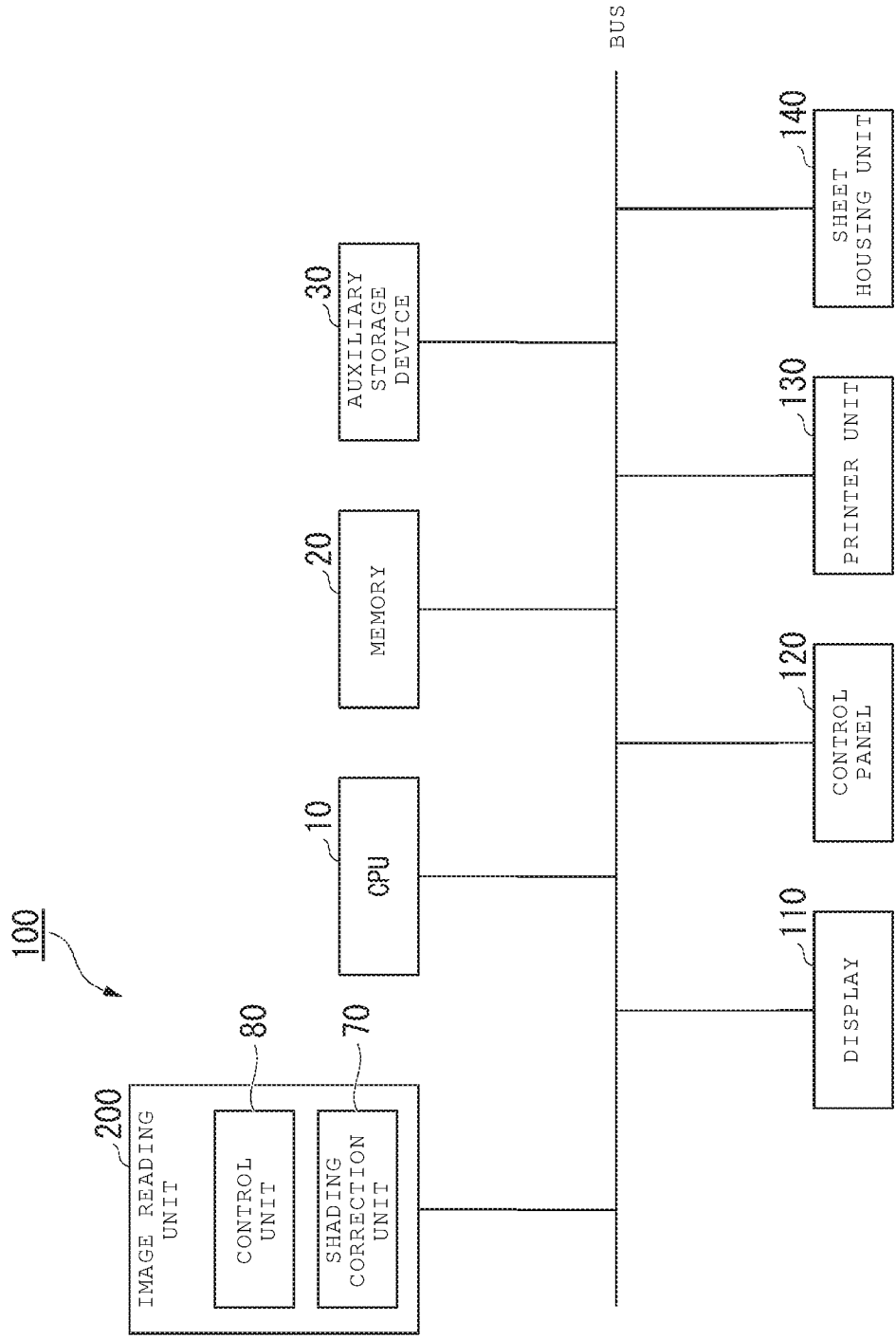
FIG. 2 illustrates an example schematic configuration of the image forming apparatus.

FIG. 2 illustrates an example schematic configuration of the image forming apparatus 100.

The image forming apparatus 100 includes a central processing unit (CPU) 10, a memory 20, and an auxiliary storage device 30 which is connected by a bus and executes a program. The image forming apparatus 100 includes the display 110, the control panel 120, the printer unit 130, the sheet housing unit 140, and the image reading unit 200, controlled by executing the program. The various functions or a part of the image forming apparatus 100 may be implemented using the hardware such as an application specific integrated circuit (ASIC), a programmable logic device (PLD), or a field programmable gate array (FPGA). The program may be recorded on a computer readable recording medium. The computer readable recording medium is, for example, a portable medium such as a flexible disk, a magnetic disk, a ROM, and a CD-ROM, and a storage device such as a hard disk equipped in a computer system. The program may be transmitted over a network connection.

The CPU 10 reads the program stored in the auxiliary storage device 30 into the memory 20 and executes the program. Thereby, the CPU 10 serves as a control unit for controlling each functional unit of the image forming apparatus 100. The CPU which serves as the control unit may be provided individually in each functional unit.

The memory 20 is, for example, a random access memory (RAM). The memory 20 stores data to be used by each functional unit which is included in the image forming apparatus 100, temporarily. The memory 20 may store digital data generated by the image reading unit 200.

The auxiliary storage device 30 is, for example, a hard disk or a solid state drive (SSD) and stores various types of data items. The various types of data items are, for example, image data. The image data is digital data generated by the image reading unit 200.

The image reading unit 200 further includes a shading correction unit 70 and a control unit 80.

The shading correction unit 70 generates reference data used for the shading correction based on the image data generated by imaging the reference surface when the light source is turned on or imaging when the light source is turned off. The reference data is data indicating a color which serves as a reference for the shading correction. The shading correction unit 70 performs the shading correction with respect to the image data generated by reading of the sheet, based on the generated reference data. In addition, the shading correction unit 70 generates data which serves as a reference when detecting whether contaminant is on the reference surface, based on the image data (hereinafter, referred to as "reference data for detecting a contaminant") obtained by imaging the reference surface. The shading correction unit 70 may be implemented using the hardware such as an ASIC, a PLD, or a FPGA.

The control unit 80 controls operations of each of functional units included in the image forming apparatus 100. The function of the shading correction unit 70 may be implemented by the control unit 80. That is, the shading correction unit 70 and the control unit 80 may be integrally configured, or may be configured separately.

Figure 3:
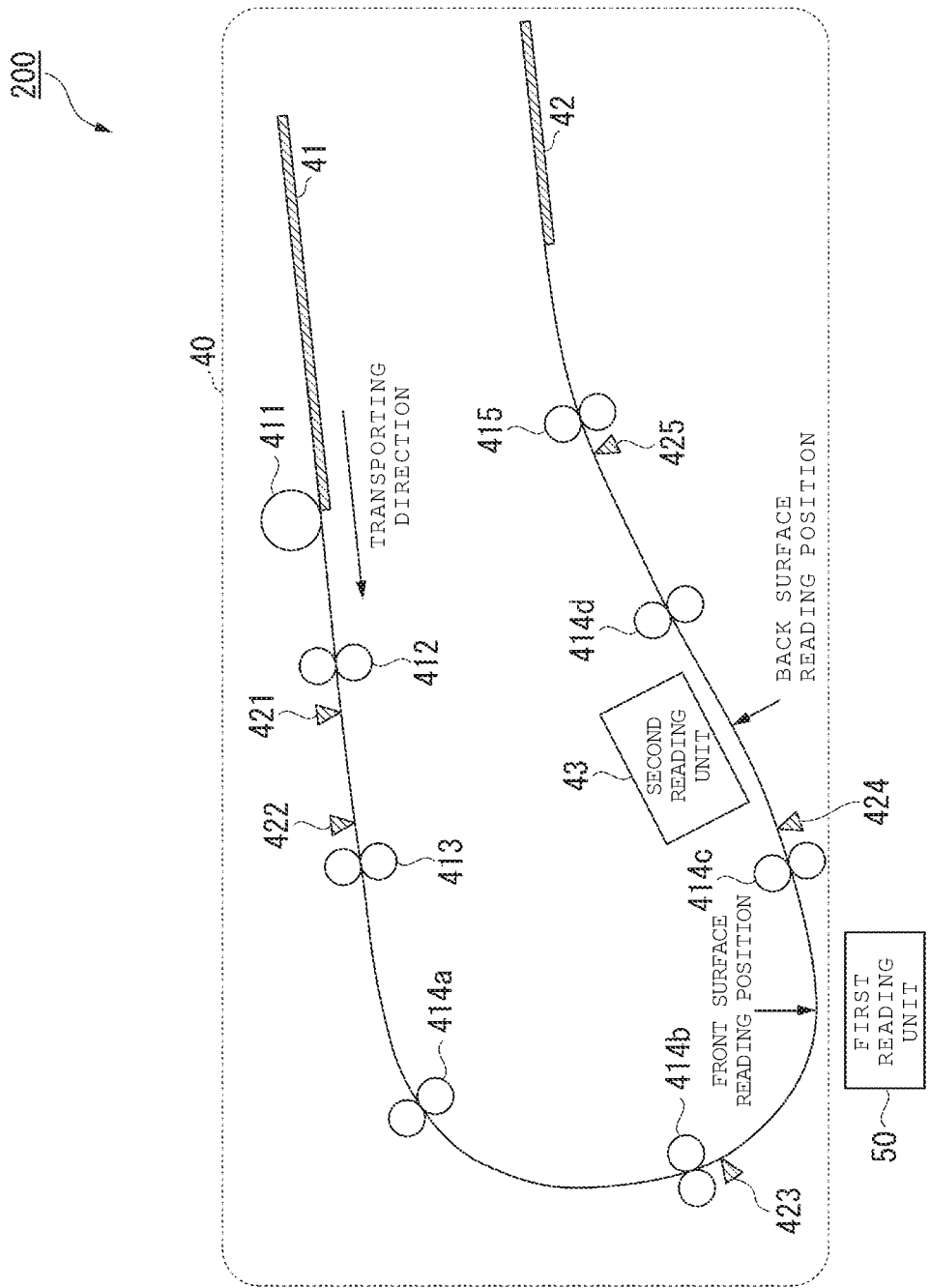
FIG. 3 illustrates an example internal configuration of a first image reading unit.

FIG. 3 illustrates an example configuration of an image reading unit 200.

The image reading unit 200 includes an automatic document feeder (ADF) 40 and a first reading unit 50. Here, the ADF 40 functions as a reading device of a sheet back surface and the first reading unit 50 functions as a reading device of a sheet front surface.

The ADF 40 includes a sheet placement unit 41, a sheet feeding roller 411, a separation roller 412, a registration roller 413, a transporting roller 414a, a transporting roller 414b, a transporting roller 414c, a transporting roller 414d, a sheet discharging roller 415, a sheet discharging unit 42, and a second reading unit 43.

A sheet is initially positioned on the sheet placement unit 41.

The sheet feeding roller 411 feeds the sheet positioned on the sheet placement unit 41.

The separation roller 412 separates the sheets fed by the sheet feeding roller 411 one by one and feds the sheet to registration roller 413.

The registration roller 413 aligns a leading end of the sheet fed from the separation roller 412. The registration roller 413 sends the sheet in which the leading end is aligned in a sheet transport direction.

The transporting rollers 414a, 414b, 414c, and 414d send the sheet transported by the registration roller 413 in the sheet transport direction. In the following description, when the transporting rollers 414a, 414b, 414c, and 414d are not distinguished from each other, the rollers are collectively referred to as the transporting rollers 414.

The sheet discharging roller 415 sends the sheet transported by the transporting roller 414 to the sheet discharging unit.

The sheet discharging unit 42 stacks the sheet sent by the transporting roller 414.

The second reading unit 43 includes a light source lighting the back surface of the sheet and an image sensor such as a CCD or CIS. The second reading unit 43 generates image data of the back surface by lighting the back surface of the transported sheet with the light source and reading the back surface.

Furthermore, the ADF 40 includes various types of sensors for detecting the sheet moving on a transporting path. Specifically, the ADF 40 further includes a post-separation sensor 421, a registration sensor 422, a front surface position sensor 423, a rear surface position sensor 424, and a sheet discharging sensor 425.

The post-separation sensor 421 detects the sheet sent from the separation roller 412.

The registration sensor 422 detects the sheet which is transported to the registration roller 413.

The front surface position sensor 423 detects the sheet sent toward a reading position (hereinafter, referred to as a "front surface reading position") of the first reading unit 50 from the transporting roller 414b.

The back surface position sensor 424 detects the sheet sent toward a reading position (hereinafter, referred to as a "back surface reading position") of the second reading unit 43 from the transporting roller 414c.

The sheet discharging sensor 425 detects the sheet sent from the sheet discharging roller 415 toward the sheet discharging unit 42.

The first reading unit 50 includes a light source lighting the front surface of the sheet displaced on the sheet placement unit 41 and an image sensor such as a CCD or CIS. The first reading unit 50 generates image data of the front surface by lighting the front surface of the sheet displaced on the sheet placement unit 41 with the light source and reading the back surface.

Figure 4:
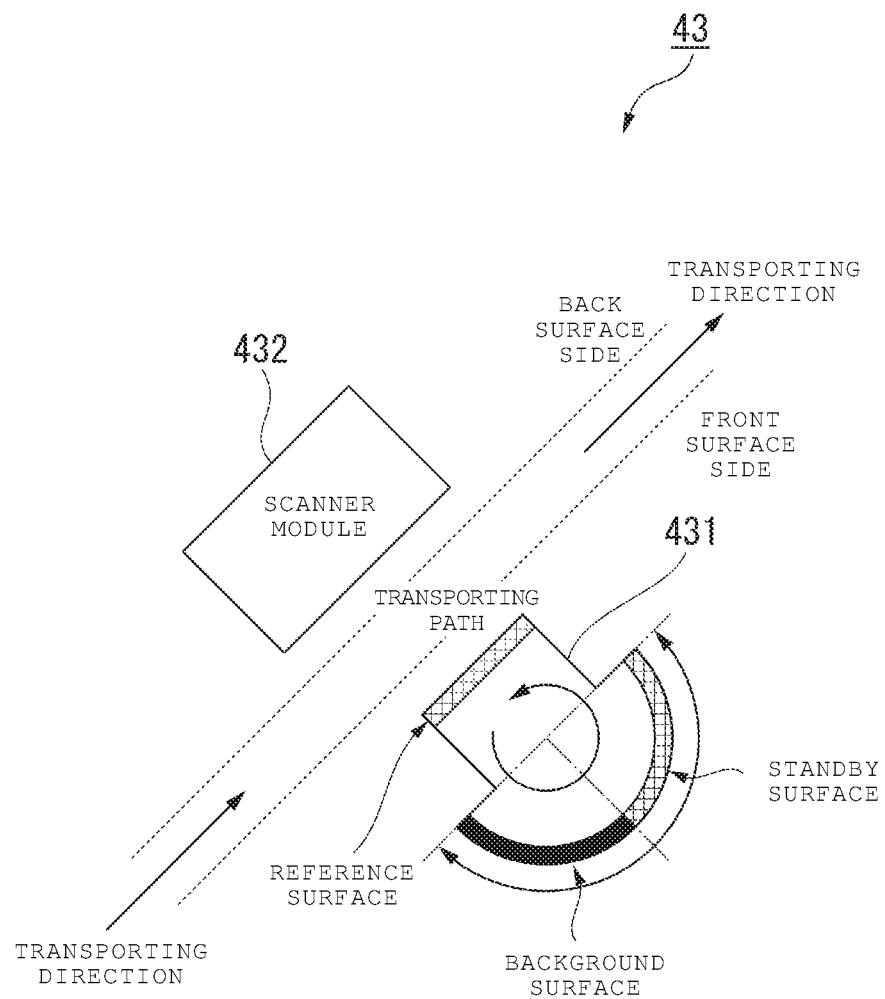
FIG. 4 illustrates an example configuration of a second reading unit.

FIG. 4 illustrates an example configuration of the second reading unit 43.

The second reading unit 43 includes a reference roller 431 and a scanner module 432.

When the reading of the sheet back surface is performed, the reference roller 431 plays a role of a guide for the sheet and also includes a reference surface (first surface) for acquiring the reference data to be used to perform the shading correction. Among the roller surfaces of the reference roller 431, an area other than the reference surface is referred to as a standby surface (second surface). For example, as illustrated in FIG. 4, the reference roller 431 includes each half of the roller surface as the reference surface and the standby surface.

The reference roller 431 can be rotated with respect to the paper surface by controlling the driving unit (for example, a motor or the like) by the control unit 80. By rotating, the reference roller 431 can change the positions of the reference surface and the standby surface with respect to the scanner module 432. When the reference data is acquired, the control unit 80 rotates the reference roller 431 so that the scanner module 432 faces the reference surface. On the other hand, when the reference data is not acquired, the control unit 80 rotates the reference roller 431 so that the scanner module 432 faces the standby surface. By controlling the reference roller 431 in this manner, the image forming apparatus 100 can prevent a contaminant from adhering to the reference surface due to contact with the sheet or the like.

In addition, the reference roller 431 includes a background surface that serves as a background of the read sheet. For example, as illustrated in FIG. 4, the reference roller 431 includes the background surface which occupies the half of the standby surface. The background surface has a background color (for example, black) which is distinguishable from the outline of the sheet.

The scanner module 432 includes a light source for lighting the sheet to be read and an image sensor such as a CCD or CIS. The scanner module 432 generates image data of the sheet back surface by reading the back surface of the transported sheet. In addition, the scanner module 432 generates the reference data by imaging the reference surface with the lighting source turned on or imaging when the lighting source is turned off.

When the reading of the non-standard sized sheet is performed, the control unit 80 controls the reference roller 431 so that the background surface is positioned at the reading position of the scanner module 432. On the other hand, when the reading of the standard sized sheet is performed, the control unit 80 controls the reference roller 431 so that the portion other than the background surface among the standby surface is positioned at the reading position of the scanner module 432.

The description returns FIG. 3. The first reading unit 50 includes a light source for lighting a front surface of the sheet placed on the sheet placement unit 41 and an image sensor such as the CCD or the CIS. The first reading unit 50 generates image data of the front surface by lighting the front surface of the sheet placed on the sheet placement unit 41 with the light source and reading the front surface.

The image forming apparatus 100 of the embodiment generates or updates the reference data for detecting a contaminant using at least the following timings under the control of the control unit 80, to thereby perform the shading correction with higher accuracy:

(1) When power is turned on; and
(2) When image data is generated by reading a sheet.

Hereinafter, an operation example of the image forming apparatus 100 at the above timing will be described.

Figure 5:
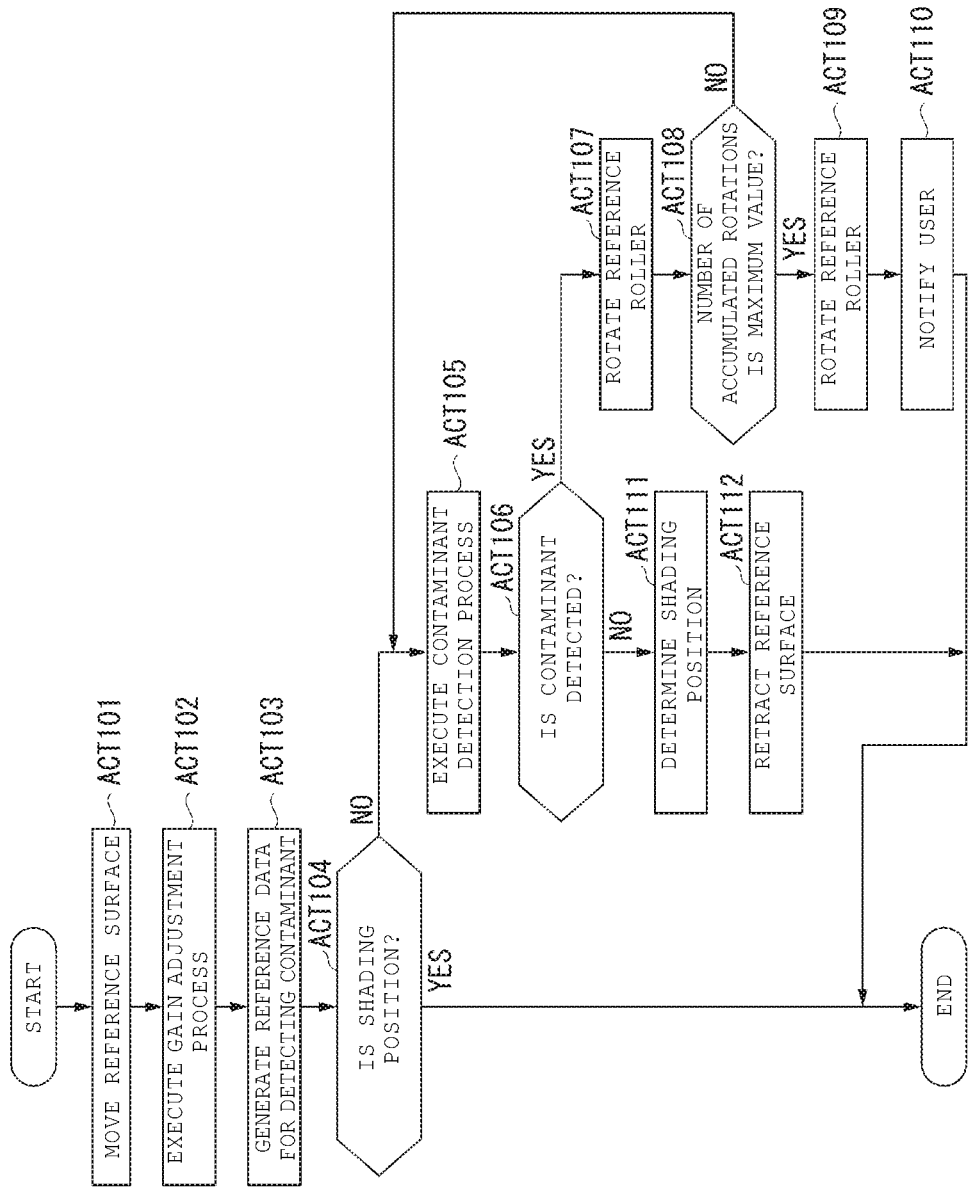
FIG. 5 is a flowchart illustrating an example sequence of operations when power is turned on in the image forming apparatus.

FIG. 5 is a flowchart illustrating an example sequence of operations when turning on the power in the image forming apparatus 100.

First, the control unit 80 moves the reference surface by rotating the reference roller 431 (ACT 101). Specifically, the control unit 80 moves the reference surface to a predetermined reference position (hereinafter, referred to as a "first reference position") with respect to the scanner module 432.

The first reference position is a position where the scanner module 432 starts reading the reference surface. The scanner module 432 starts reading the reference surface in a state where the reference surface is positioned at the first reference position. The scanner module 432 can image the entire the reference surfaces by continuously imaging the reference surface which is rotated a predetermined amount in one direction. For example, the control unit 80 rotates the reference roller 431 so that an edge of the reference surface becomes an edge of the reading range of the scanner module 432 in the transporting direction as a first reference position. The information indicating a rotating amount of the reference surface by the predetermined amount may be stored in advance in an internal storage of the image reading unit 200 or the ADF 40.

Subsequently, the control unit 80 executes a gain adjustment process that is a pre-process for acquiring image data (ACT 102). The gain adjustment process is a process of determining the gain for maintaining strength of an output signal with respect to strength of an input signal at a certain level. Specifically, the control unit 80 reads the reference surface which is positioned on the first reference position by controlling the scanner module 432 and detects a peak of a brightness distribution for the image data of the acquired reference surface. The control unit 80 determines the gain for correcting the brightness in accordance with a target output strength based on the detected peak brightness (hereinafter, referred to as a "peak brightness"). Thereafter, the determined gain is used for correcting the image which is imaged by the scanner module 432.

As described above, the reference surface is read to obtain a white level reference value that is applied to the brightness value. Therefore, by executing the gain adjustment process of ACT 102, the white level of the image data is adjusted.

Subsequently, the shading correction unit 70 generates the reference data for detecting a contaminant based on the image data of the reference surface output from the scanner module 432 (ACT 103). Specifically, the reference data for detecting a contaminant is generated as information indicating a threshold value of the brightness value which can distinguish between an area with a contaminant adhered thereto and an area with no contaminant. For example, the shading correction unit 70 generates information indicating a maximum brightness value in the image of the reference surface which is imaged while rotating the reference roller 431 at a predetermined amount as the reference data for detecting a contaminant. The reference data for detecting a contaminant is not necessarily information indicating the maximum value of the brightness value. For example, the reference data for detecting a contaminant be information indicating any value as long as the information can be used as the threshold value of the brightness value which can distinguish between an area with a contaminant and an area with no contaminant. For example, the reference data for detecting a contaminant may be information indicating a minimum value, an average value, and an intermediate value, of the brightness values of areas assumed to have a contaminant. The shading correction unit 70 maintains the reference data for detecting a contaminant generated in such that manner in the internal storage region.

Subsequently, the control unit 80 determines whether the shading position is previously determined in own apparatus (ACT 104). The shading position is a position on the reference surface at which the white reference data is acquired. The shading position is specified according to the state where the contaminant is on the reference surface and is indicated by shading information (positional information).

If the apparatus already stores the shading information, the control unit 80 determines that the shading position is previously determined, and if the apparatus does not already store the shading information, the control unit 80 determines that the shading position is not determined.

When the shading position is previously determined (ACT 104: YES), the control unit 80 ends the process without performing a process for determining the shading position. On the other hand, when the shading position is not determined (ACT 104: NO), the shading correction unit 70 executes a contaminant detection process with respect to the reference surface within the imaging range using the reference data for detecting a contaminant generated in ACT 103 (ACT 105). The contaminant detection process is a process for detecting the contaminant on the reference surface by comparing the reference data for detecting a contaminant and each brightness value of the image data in which the reference surface is imaged. By rotating the reference roller 431 at a predetermined amount, the control unit 80 controls the reference roller 431 and the shading correction unit 70 such that the contaminant detection process is executed for the entire reference surface.

The determination of whether the reference surface has a contaminant may be determined by an arbitrary method depending on the specific reference data for detecting a contaminant. For example, when the reference data for detecting a contaminant includes a brightness value indicating the most severe contaminant (that is, the maximum value in the image data), the shading correction unit 70 may detect a region of the reference surface corresponding to a pixel having a brightness value closest to the reference data for detecting a contaminant as a region with the contaminant. In addition, for example, when the reference data for detecting a contaminant includes the brightness value indicating the most mild contaminant (that is, the minimum value within a range in which the contaminant is assumed to adhere), the shading correction unit 70 may detect the region of the reference surface corresponding to the pixel having the brightness value higher than that of the reference data for detecting a contaminant as a region with the contaminant.

The control unit 80 determines whether the contaminant on the reference surface is detected in the contaminant detection process (ACT 106). When the contaminant on the reference surface is detected in the contaminant detection process (ACT 106: YES), the control unit 80 rotates the reference roller 431 a predetermined rotation amount (ACT 107). By rotating of the reference roller 431, a new region of the reference roller 431 becomes the imaging target of the scanner module 432. The control unit 80 stores the number of the rotations of the reference roller 431 (hereinafter, the "number of accumulated rotations") and updates the number of the accumulated rotations according to the execution of ACT 107.

Subsequently, the control unit 80 determines whether the number of the accumulated rotations of the reference roller 431 has reached the predetermined maximum number of the rotations (ACT 108). The maximum number of the rotations is determined in advance based on one full rotation of the reference roller 431 and the size of the reference surface. By performing the rotation of the reference roller 431 at the maximum number, the contaminant detection process is executed on the entire reference surface.

When the accumulated number of the rotations of the reference roller 431 is not the maximum number (ACT 108: NO), the control unit 80 returns to the process in ACT 105, and the contaminant detection process is executed with respect to the region of the reference surface which is to be a new imaging target with respect to the shading correction unit 70.

On the other hand, when the accumulated number of the rotations of the reference roller 431 has reached the maximum value (ACT 108: YES), the control unit 80 rotates the reference roller 431 (ACT 109) so that the reference surface is returned to a predetermined reference position. The reference position here may be any position where the scanner module 432 can perform the reading of the reference surface. For example, the reference position may be the first reference position. The information indicating the predetermined reference position may be stored in an internal storage region of the image reading unit 200 or the image forming apparatus 100 in advance. Here, by returning the reference surface to the predetermined reference position, it is possible to avoid a status in which the image reading unit 200 is locked and is not operable. The locked state of the image reading unit 200 is a state in which the shading position cannot be determined. If the shading position cannot be determined, the shading correction unit 70 cannot perform the shading correction, and the scanning cannot be finished.

Subsequently, the control unit 80 notifies a user that the shading position cannot be determined (ACT 110). For example, the notification is provided to the user or a maintenance person of the image forming apparatus 100. In this time, the control unit 80 may store the information indicating that the shading position cannot be determined in an internal storage region. In this manner, when the maintenance of the image forming apparatus 100 is performed, the notification that the reference surface is contaminated is acknowledged by the maintenance person.

In addition, on the other hand, when the contaminant on the reference surface cannot be detected in the contaminant detection process in ACT 105 (ACT 106: NO), the control unit 80 determines the position of the reference surface at the time point thereof as the shading position (ACT 111). The control unit 80 generates and stores the shading information indicating the position of the reference surface which is determined as the shading position. If the control unit 80 generates the shading information, the control unit 80 retracts the reference surface by rotating the reference roller 431 so that the standby surface faces the scanner module 432 (ACT 112). After the retraction of the reference surface is finished, the control unit 80 ends the process.

Figure 6:
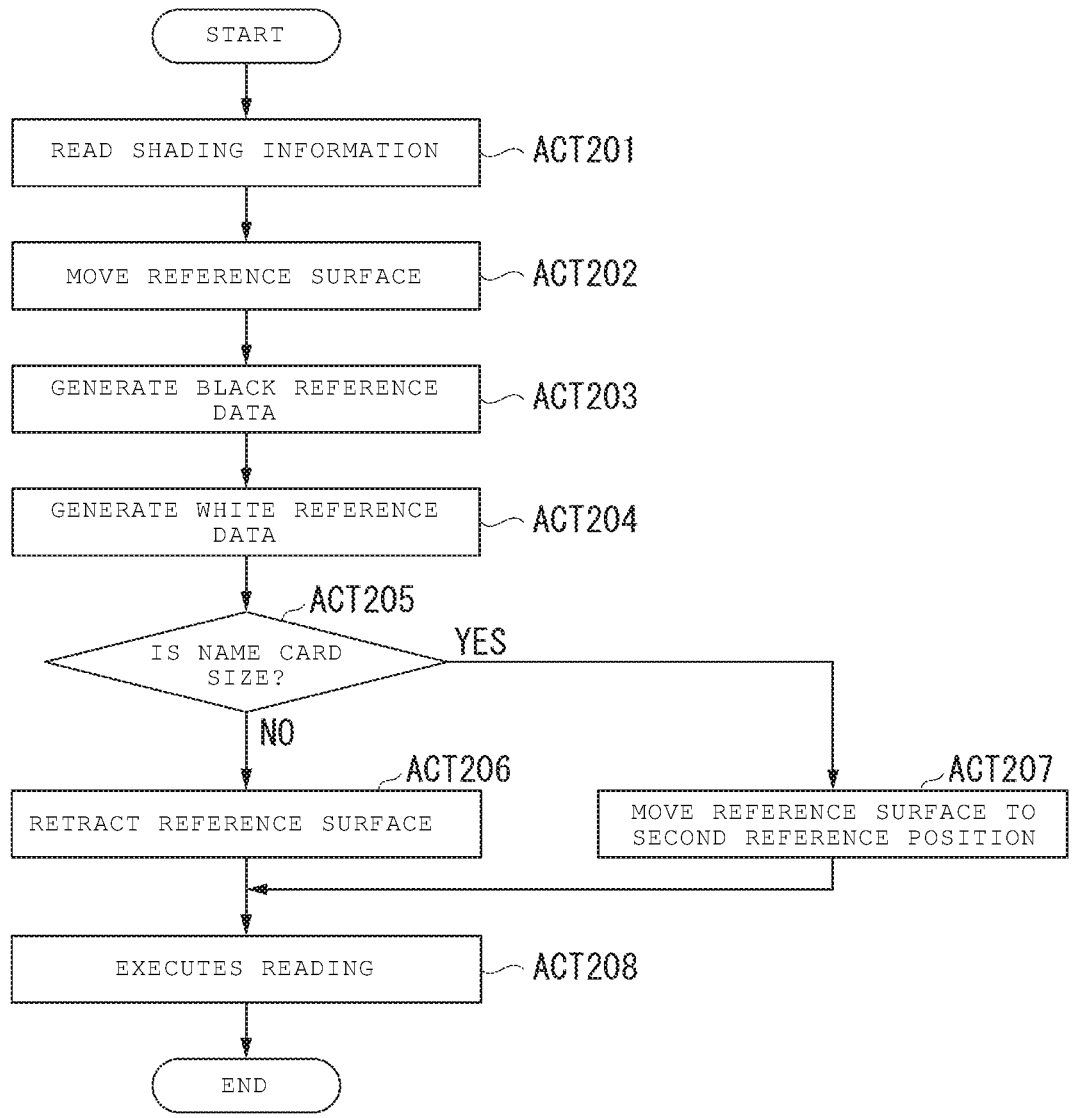
FIG. 6 is a flowchart illustrating an example sequence of operations for reading a sheet.

FIG. 6 is a flowchart illustrating a first example sequence of operations for reading the sheet in the image forming apparatus 100.

FIG. 6 indicates an example of a process to be executed before starting the job according to the generation of the job in the image forming apparatus 100. The job here means a series of operations associated with the reading of the sheet by the image reading unit 200. Specifically, the job is generated in response on instructions for performing a process such as a copy process for copying the image formed on the sheet to the other sheet or a scan process for generating image data for reading the image which is formed on the sheet.

First, when the job is generated in the image forming apparatus 100, the control unit 80 reads the shading information stored in the apparatus (ACT 201). The control unit 80 rotates the reference roller 431, and moves the reference surface to the shading position indicated by the read shading information (ACT 202).

When the reference surface is moved to the shading position, the control unit 80 turns off the light source and controls the acquisition of the black reference data using the second reading unit 43 and the shading correction unit 70. At this time, the second reading unit 43 performs an imaging operation in a state with the light source is turned off, and outputs the generated image data to the shading correction unit 70. The shading correction unit 70 generates the black reference data based on the image data which is acquired in the state where the light source is turned off (ACT 203).

Subsequently, the control unit 80 turns on the light source and controls the acquisition of the white reference data using the second reading unit 43 and the shading correction unit 70. At this time, the second reading unit 43 performs an imaging operation in a state with the light source is turned on, and outputs the generated image data of the illuminated reference surface to the shading correction unit 70. The shading correction unit 70 generates the white reference data based on the image data of the illuminated reference surface (ACT 204).

When the acquisition of the reference data is finished, the control unit 80 determines whether the size of the sheet to be read is a name card size (ACT 205). For example, if the user designates the size of the sheet to be read, the control unit 80 can distinguish the sheet size based on the input information of the user. In addition, the image forming apparatus 100 may include a unit for transporting the sheet which is transported to the first reading unit 50 and the second reading unit 43 to a previous stage of the first reading unit 50 again. In such a case, the control unit 80 may detect the sheet size with the first reading unit 50 or the second reading unit 43.

When the size of the sheet to be read is not the name card size (ACT 205: NO), the control unit 80 retracts the reference surface by rotating the reference roller 431 so that the standby surface faces the scanner module 432 (ACT 206), and ends the process. On the other hand, when the size of the sheet to be read is the name card size (ACT 205: YES), the control unit 80 moves the reference surface to the second reference position (ACT 207), and ends the process.

The second reference position is a position of the reference surface in a state where the scanner module 432 faces the second standby surface. That is, the sheet having the name card size is read in a state where the reference surface is positioned on the second reference position, so that the generated image data includes the second standby surface as background. As described above, since the second standby surface is black, the edge between the sheet and the background can be emphasized, and it is possible to more correctly detect the deviation of the direction of the sheet. In this manner, by generating the image data in which the second standby surface is set as the background with respect to the sheet having the name card size where the skew is easily generated, the image forming apparatus 100 of the embodiment can more correctly correct the skew of the image data.

When the reference surface is moved to the position in accordance with the sheet size, the control unit 80 transports the sheet to be read to the second reading unit 43 and executes the reading of the sheet with respect to the second reading unit 43 (ACT 208).

Figure 7:
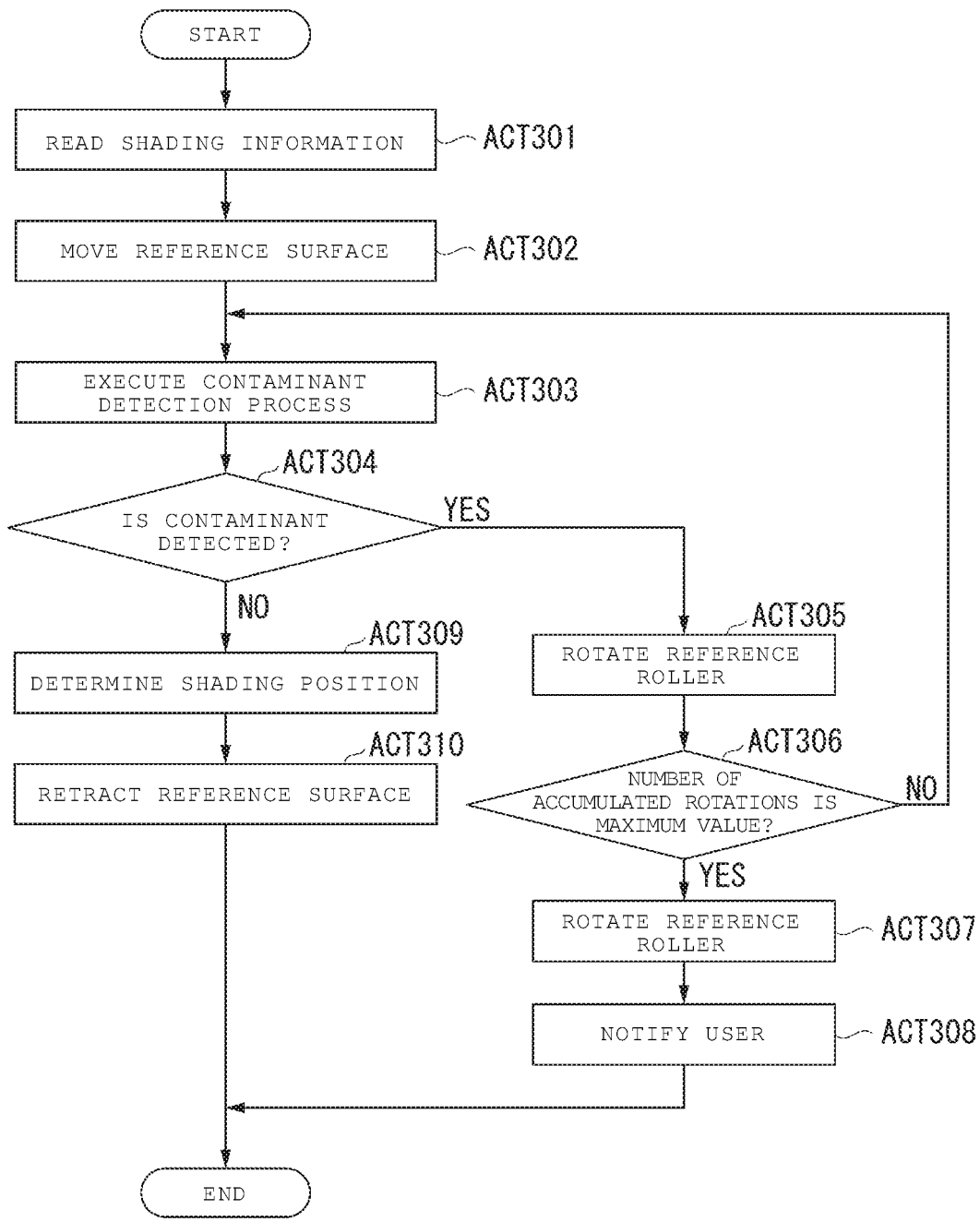
FIG. 7 is a flowchart illustrating a second example sequence of operations for reading the sheet.

FIG. 7 is a flowchart illustrating a second example sequence of operations for reading of the sheet in the image forming apparatus 100.

FIG. 7 illustrates an example of a process to be executed after the image generation is ended in the image forming apparatus 100 of the embodiment.

First, when the execution of the job is finished in the image forming apparatus 100, the control unit 80 reads the stored shading information (ACT 301). By rotating the reference roller 431, the control unit 80 moves the reference surface to the shading position indicated by the read shading information (ACT 302).

When the reference surface is moved to the shading position, the shading correction unit 70 executes a contaminant detection process with respect to the reference surface within the imaging range, using the previously stored reference data for detecting a contaminant (ACT 303). The contaminant detection process to be executed here is the same process as the contaminant detection process illustrated in FIG. 4.

The control unit 80 determines whether a contaminant on the reference surface is detected in the contaminant detection process (ACT 304). When a contaminant on the reference surface is detected in the contaminant detection process (ACT 304: YES), the control unit 80 rotates the reference roller 431 at a predetermined rotation amount (ACT 305).

Subsequently, the control unit 80 determines whether the number of the accumulated rotations of the reference roller 431 is reached the predetermined maximum number of rotations (ACT 306). When the accumulated number of the rotations of the reference roller 431 has not reached the maximum number (ACT 306: NO), the control unit 80 returns to the process in ACT 303, and the contaminant detection process is executed with respect to the region of the reference surface which is to be a new imaging target with respect to the shading correction unit 70.

On the other hand, when the accumulated number of the rotations of the reference roller 431 is reached the maximum value (ACT 306: YES), the control unit 80 rotates the reference roller 431 (ACT 307), until the reference surface is returned to a predetermined reference position. The reference position here may be any position as long as the reference position is a position where the scanner module 432 can perform the reading of the reference surface. For example, the reference position may be the first reference position. The information indicating the predetermined reference position may be stored in an internal storage region of the image reading unit 200 or the image forming apparatus 100 in advance. By returning the reference surface to the predetermined reference position, it is possible to avoid a status in which the image reading unit 200 is locked and not operable.

Subsequently, the control unit 80 notifies a user that the shading position cannot be determined (ACT 308). For example, the notification is provided to the user or a maintenance person of the image forming apparatus 100. At this time, the control unit 80 may store the information indicating that the shading position cannot be determined in an internal storage region. Accordingly, when the maintenance of the image forming apparatus 100 is performed, the notification that the reference surface is contaminated can be provided to the maintenance person.

In addition, on the other hand, when no contaminant on the reference surface is detected in the contaminant detection process in ACT 303 (ACT 304: NO), the control unit 80 determines the current position of the reference surface as the new shading position (ACT 309). The control unit 80 generates the shading information indicating the position of the reference surface which is determined as the new shading position and updates the original shading information with new shading information. If the control unit 80 generates the new shading information, the control unit 80 retracts the reference surface by rotating the reference roller 431 so that the standby surface faces the scanner module 432 (ACT 310). After the retraction of the reference surface is finished, the control unit 80 ends the process.

The image forming apparatus 100 includes the control unit 80 for detecting the contaminant adhering to the reference surface and generating the white reference data which is required for the shading correction. The control unit 80 generates the white reference data using the image data from the region where the contaminant cannot be detected in the reference surface. Therefore, even if the contaminant is on a part of the reference surface, the appropriate white reference data can be generated by avoiding the region, and the shading correction can be implemented with higher accuracy.

Hereinafter, modification examples of the image reading apparatus, the image reading method, and the image forming apparatus of embodiment will be described.

The image reading unit 200 which is provided on the image forming apparatus 100 of the above-described embodiment may be provided as an image reading apparatus which is independent from the image forming apparatus 100.

The image forming apparatus 100 of the above-described embodiment may further include a heating unit for decoloring an image formed using a decolorable toner by heating the sheet. In this case, the heating unit may be a fixing unit of the printer unit 130.

A name card size of the above-described embodiment is an example of a sheet size (non-standard size) smaller than the standard size. The non-standard size may be any sheet size other than the name card size as long as the sheet size is smaller than the standard size.

In this embodiment, "decoloring" means to make it difficult to recognize a color of an image formed on an image receiving member after the image is formed on the image receiving member by a recording material which has different color from the color of the image receiving material. The color of recording material may be any color including black, white, or a chromatic color.

While certain embodiments have been described these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image reading apparatus comprising:
   a reference roller having a reference surface;
   a scanner configured to scan a portion of the reference surface; and
   a controller configured to:
      control the scanner to continuously scan the portion of the reference surface while the reference roller is rotated so that the scanner scans an entire area of the reference surface and generates image data thereof;
      based on the generated image data, generate a reference value for detecting a contaminant on the reference surface;
      execute a contaminant detection process with respect to a first portion of the reference surface that is within an imaging range of the scanner by scanning the first portion of the reference surface and comparing the generated reference value with each of brightness values of the first portion of the reference surface; and
      when the contaminant is detected in the contaminant detection process, rotate the reference roller by a predetermined angle and repeat the contaminant detection process.

2. The image reading apparatus according to claim 1, wherein
   the controller is configured to generate positional information that indicates a position of the contaminant on the reference surface, based on the reference value.

3. The image reading apparatus according to claim 2, wherein
   the reference value is a brightness value for a color closest to one of black and white.

4. The image reading apparatus according to claim 2, wherein
   the controller is configured to
      generate the reference value when the image reading apparatus is turned on, and
      when the positional information has not been generated, generate the positional information based on the generated reference value.

5. The image reading apparatus according to claim 1, wherein
   the scanner and the reference roller are disposed so that a sheet is transported therebetween.

6. The image reading apparatus according to claim 1, wherein
   as long as the contaminant is detected in the contaminant detection process, the contaminant detection process is repeated until a total number of the rotation of the reference roller reaches a predetermined number.

7. The image reading apparatus according to claim 1, wherein
   when the contaminant is not detected in the contaminant detection process, the controller generates positional information that indicates a current position of the reference surface.

8. An image forming apparatus comprising:
   a reference roller having a reference surface;
   a scanner configured to scan a portion of the reference surface;
   a controller configured to:
      control the scanner to continuously scan the portion of the reference surface while the reference roller is rotated so that the scanner scans an entire area of the reference surface and generates image data thereof;
      based on the generated image data, generate a reference value for detecting a contaminant on the reference surface;
      execute a contaminant detection process with respect to a first portion of the reference surface that is within an imaging range of the scanner by scanning the first portion of the reference surface and comparing the generated reference value with each of brightness values of the first portion of the reference surface; and
      when the contaminant is detected in the contaminant detection process, rotate the reference roller by a predetermined angle and repeat the contaminant detection process; and
   a printer that forms an image on a sheet by applying shading correction based on the generated reference value.

9. The image forming apparatus according to claim 8, wherein
the controller is configured to generate positional information that indicates a position of the contaminant on the reference surface, based on the reference value.

10. The image forming apparatus according to claim 9, wherein
the reference value is a brightness value for a color closest to one of black and white.

11. The image forming apparatus according to claim 9, wherein
the controller is configured to
generate the reference value when the image reading apparatus is turned on, and
when the positional information has not been generated, generate the positional information based on the generated reference value.

12. The image forming apparatus according to claim 8, wherein
the scanner and the reference roller are disposed so that a sheet is transported therebetween.

13. The image forming apparatus according to claim 8, wherein
as long as the contaminant is detected in the contaminant detection process, the contaminant detection process is repeated until a total number of the rotation of the reference roller reaches a predetermined number.

14. The image forming apparatus according to claim 8, wherein
when the contaminant is not detected in the contaminant detection process, the controller generates positional information that indicates a current position of the reference surface.

15. A method carried out by an image reading apparatus, the method comprising:
continuously scanning, with a scanner, a portion of a reference surface of a reference roller while rotating the reference roller so that the scanner scans an entire area of the reference surface and generates image data thereof;
based on the generated image data, generating a reference value for detecting a contaminant on the reference surface;
executing a contaminant detection process with respect to a first portion of the reference surface that is within an imaging range of the scanner by scanning the first portion of the reference surface and comparing the generated reference value with each of brightness values of the first portion of the reference surface; and
when the contaminant is detected in the contaminant detection process, rotating the reference roller by a predetermined angle and repeating the contaminant detection process.

16. The method according to claim 15, further comprising:
generating positional information that indicates a position of the contaminant on the reference surface, based on the reference value.

17. The method according to claim 16, wherein
the reference value is a brightness value for a color closest to one of black and white.

18. The method according to claim 16, wherein
the reference value is generated when the image reading apparatus is turned on, and
when the positional information has not been generated, the positional information is generated based on the generated reference value.

19. The method according to claim 15, wherein
as long as the contaminant is detected in the contaminant detection process, the contaminant detection process is repeated until a total number of the rotation of the reference roller reaches a predetermined number.

20. The method according to claim 15, further comprising:
when the contaminant is not detected in the contaminant detection process, generating positional information that indicates a current location of the reference surface.

* * * * *